US009301326B2

(12) United States Patent
Ogawara

(10) Patent No.: US 9,301,326 B2
(45) Date of Patent: Mar. 29, 2016

(54) WIRELESS COMMUNICATION SYSTEM, WIRELESS COMMUNICATION METHOD, AND WIRELESS TERMINAL

(71) Applicant: Osamu Ogawara, Kanagawa (JP)

(72) Inventor: Osamu Ogawara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 216 days.

(21) Appl. No.: 13/858,992

(22) Filed: Apr. 9, 2013

(65) Prior Publication Data
US 2013/0272224 A1 Oct. 17, 2013

(30) Foreign Application Priority Data

Apr. 12, 2012 (JP) .................. 2012-091383

(51) Int. Cl.
*H04W 76/02* (2009.01)
*H04W 48/10* (2009.01)
*H04L 12/24* (2006.01)
*H04W 84/12* (2009.01)

(52) U.S. Cl.
CPC ............ *H04W 76/021* (2013.01); *H04W 48/10* (2013.01); *H04L 41/0853* (2013.01); *H04W 84/12* (2013.01)

(58) Field of Classification Search
None
See application file for complete search history.

(56) References Cited

U.S. PATENT DOCUMENTS

| 7,648,812 | B2 | 1/2010 | Umehara | |
|---|---|---|---|---|
| 2005/0148326 | A1* | 7/2005 | Nogawa et al. | 455/420 |
| 2005/0149204 | A1* | 7/2005 | Manchester et al. | 700/1 |
| 2005/0170774 | A1* | 8/2005 | Shiohara et al. | 455/11.1 |
| 2006/0031438 | A1* | 2/2006 | Tokuhashi et al. | 709/223 |
| 2006/0239208 | A1* | 10/2006 | Roberts et al. | 370/254 |
| 2007/0088951 | A1 | 4/2007 | Nakajima | |

(Continued)

FOREIGN PATENT DOCUMENTS

| JP | 2006-254301 | 9/2006 |
|---|---|---|
| JP | 2007-065620 | 3/2007 |

(Continued)

OTHER PUBLICATIONS

"Complete Guide to Utilization of Wi-Fi for PC and Smartphone", by Katsuya Sotomura, ASCII Media Works Co. Ltd., Yasuhiko Goto, Mar. 24, 2012, pp. 23-27.

(Continued)

*Primary Examiner* — Edan Orgad
*Assistant Examiner* — Rebecca Song
(74) *Attorney, Agent, or Firm* — IPUSA, PLLC

(57) ABSTRACT

A wireless communication system includes a first wireless terminal including a first network control unit that sets first wireless setting information as current wireless setting information of the first wireless terminal, a generating unit that generates an SSID including identification information of the first wireless terminal, and a first wireless communication unit that transmits a beacon including the SSID; and a second wireless terminal including a second wireless communication unit that receives the beacon, an extracting unit that extracts the SSID from the beacon and extracts the identification information from the SSID, and a second network control unit that sets second wireless setting information, stored in the second wireless terminal and corresponding to the first wireless setting information, as current wireless setting information of the second wireless terminal and establishes a wireless connection with the first wireless terminal based on the identification information and the second wireless setting information.

20 Claims, 15 Drawing Sheets

(56) References Cited

U.S. PATENT DOCUMENTS

| | | | |
|---|---|---|---|
| 2007/0130296 A1* | 6/2007 | Kim | H04W 76/021 709/220 |
| 2008/0299909 A1* | 12/2008 | Sakai | 455/66.1 |
| 2010/0203825 A1* | 8/2010 | Goto | 455/7 |
| 2011/0222518 A1 | 9/2011 | Ota et al. | |
| 2013/0128755 A1* | 5/2013 | Ullah et al. | 370/252 |
| 2013/0155851 A1* | 6/2013 | Koodli et al. | 370/230 |

FOREIGN PATENT DOCUMENTS

| | | |
|---|---|---|
| JP | 2007-096464 | 4/2007 |
| JP | 2007-135146 | 5/2007 |
| JP | 2007-143117 | 6/2007 |
| JP | 2007-251500 | 9/2007 |
| JP | 2008-219550 | 9/2008 |
| JP | 2010-136308 | 6/2010 |
| JP | 2011-166600 | 8/2011 |
| JP | 2011-188238 | 9/2011 |

OTHER PUBLICATIONS

Japanese Office Action dated Jul. 22, 2014.
Japanese Office Action dated Apr. 28, 2015.

* cited by examiner

FIG.3

| WIRELESS COMMUNICATION PARAMETER | SETTING 1 |
|---|---|
| COMMUNICATION MODE | AD HOC |
| AUTHENTICATION METHOD | OPEN SYSTEM |
| ENCRYPTION METHOD | WEP (PASS:XXX) |
| FREQUENCY CHANNEL | 11 |
| NETWORK STANDARD | IEEE802.11n |
| COMMUNICATION PROTOCOL | IPv4 |
| IPv4 ADDRESS OF "CONNECTED" WIRELESS TERMINAL | 169.254.1.1 |
| IPv4 SUBNET MASK | 255.255.0.0 |

FIG.4

| WIRELESS COMMUNICATION PARAMETER | SETTING 2 |
|---|---|
| COMMUNICATION MODE | AD HOC |
| AUTHENTICATION METHOD | OPEN SYSTEM |
| ENCRYPTION METHOD | WEP (PASS:XXX) |
| FREQUENCY CHANNEL | – |
| NETWORK STANDARD | IEEE802.11n |
| COMMUNICATION PROTOCOL | IPv4 |
| IPv4 ADDRESS OF "CONNECTED" WIRELESS TERMINAL | 169.254.1.1 |
| IPv4 SUBNET MASK | 255.255.0.0 |

FIG.5

| WIRELESS COMMUNICATION PARAMETER | SETTING 3 |
|---|---|
| COMMUNICATION MODE | AD HOC |
| AUTHENTICATION METHOD | OPEN SYSTEM |
| ENCRYPTION METHOD | WEP (PASS:XXX) |
| FREQUENCY CHANNEL | 11 |
| NETWORK STANDARD | IEEE802.11n |
| COMMUNICATION PROTOCOL | IPv6 |
| IPv6 ADDRESS OF "CONNECTED" WIRELESS TERMINAL | 2001:0db8:bd05:01d2:288a:1fc0:0001:10ee |
| IPv6 PREFIX | 2001:0db8:bd05:01d2 |

FIG.6

| BYTE NO. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TERMINAL IDENTIFIER | 0 | 0 | 1 | 6 | 4 | 1 | E | D | 1 | E | 5 | A | | | | |

FIG.7

| BYTE NO. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TERMINAL IDENTIFIER | A | A | B | F | D | B | 5 | 4 | B | 5 | E | 0 | | | | |

FIG.8

| BYTE NO. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TERMINAL IDENTIFIER | 0 | 4 | 0 | 4 | 2 | 8 | 6 | - | 0 | E | 0 | | | | | |

FIG.9

| BYTE NO. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TERMINAL IDENTIFIER | 1 | 7 | 3 | 6 | 8 | 9 | 5 | 3 | 5 | 7 | 7 | 9 | 8 | 4 | 2 | 1 |

FIG.10

| BYTE NO. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| SSID | R | T | C | 0 | 0 | 1 | W | i | r | e | l | e | s | s | D | e |

| BYTE NO. | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| SSID | v | 0 | E | 0 | 0 | 1 | 6 | 4 | 1 | E | D | 1 | E | 5 | A |

FIG.11

| BYTE NO. | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| DEVICE NAME | W | i | r | e | l | e | s | s | D | e | v | 0 | E | 0 |

WIRELESS COMMUNICATION SYSTEM, WIRELESS COMMUNICATION METHOD, AND WIRELESS TERMINAL

CROSS-REFERENCE TO RELATED APPLICATION

The present application is based upon and claims the benefit of priority of Japanese Patent Application No. 2012-091383, filed on Apr. 12, 2012, the entire contents of which are incorporated herein by reference.

BACKGROUND OF THE INVENTION

1. Field of the Invention

An aspect of this disclosure relates to a wireless communication system, a wireless communication method, and a wireless terminal.

2. Description of the Related Art

Wireless networks are being used to connect various electronic information devices. For example, a personal computer (PC) may be connected via wireless communications to a projector so that an image from the PC can be displayed on a large display such as an electronic information board.

To enable terminals to communicate with each other via a wireless network, it is necessary to correctly configure the terminals for the wireless network. However, configuring a terminal for a wireless network involves setting various wireless network parameters (or wireless communication parameters) such as an IP address, a subnet mask, an authentication method, an encryption method, and an encryption key corresponding to the encryption method. Accordingly, correctly setting such wireless network parameters is difficult for a user who is unfamiliar with wireless network technologies. Here, there exist technologies that make it possible to set wireless network parameters automatically or through simple operations.

For example, Japanese Laid-Open Patent Publication No. 2006-254301 and Japanese Laid-Open Patent Publication No. 2011-188238 disclose a wireless terminal and a wireless communication system that make it possible to set wireless network parameters automatically or through simple operations. In the related-art wireless communication system, the wireless terminal generates a service set identifier (SSID) including a wireless LAN (local area network) IPv4 address and a terminal identifier (e.g., the name of the wireless terminal) of the wireless terminal, and transmits a radio beacon including the SSID.

Thus, according to the related-art technology for automatically or easily setting wireless network parameters, the IP address of the wireless terminal is included in the SSID in a radio beacon. For this reason, the related-art technology is not applicable to a wireless terminal that supports a wireless communication protocol other than the Internet protocol version 4 (IPv4).

This problem is described in more detail below. A "connected" wireless terminal (that is to be connected to a "connecting" wireless terminal that requests a connection to the "connected" wireless terminal) transmits a radio signal called a "beacon" at predetermined intervals to advertise its existence. The beacon includes an SSID with a length of 32 bytes, which is used to identify a wireless network. According to the related-art technology, the SSID includes fields for a wireless LAN IPv4 address and a terminal identifier of the "connected" wireless terminal to notify wireless network parameters to a communication counterpart (the "connecting" wireless terminal). The "connecting" wireless terminal obtains the IP address of the "connected" wireless terminal from the SSID and communicates with the "connected" wireless terminal using the obtained IP address.

Generally, only ASCII (American Standard Code for Information Interchange) characters can be included in an SSID. Therefore, an IP address is converted into hexadecimal characters and assigned to 8 bytes of the SSID, and a terminal identifier is assigned to remaining 24 bytes of the SSID. Here, when the Internet protocol version 6 (IPv6) is used as the wireless communication protocol, no information other than an IPv6 address, which requires 32 bytes (four times greater than an IPv4 address), can be included in the SSID.

For example, the technologies disclosed in JP2006-254301 and JP2011-188238 do not provide a method to include information other than an IPv6 address in the SSID and to set wireless network parameters automatically or through simple operations when IPv6 is employed as a wireless communication protocol.

Thus, with the related-art technologies, wireless communications cannot be performed when an address such as an IPv6 address with a large number of bits is used. Also with the related-art technologies, since it is necessary to exchange a large amount of wireless setting information, it takes time to establish wireless communications. Further, particularly in wireless communications, it often happens that communication packets fail to reach a counterpart communication terminal and a process of establishing a connection fails.

SUMMARY OF THE INVENTION

In an aspect of this disclosure, there is provided a wireless communication system that includes a first wireless terminal including a first storage unit configured to store first wireless setting information, and a second wireless terminal including a second storage unit configured to store second wireless setting information corresponding to the first wireless setting information. The first wireless terminal further includes a first network control unit configured to set the first wireless setting information as current wireless setting information of the first wireless terminal, a generating unit configured to generate an SSID including identification information for uniquely identifying the first wireless terminal, and a first wireless communication unit configured to transmit a beacon including the SSID. The second wireless terminal further includes a second wireless communication unit configured to receive the beacon, an extracting unit configured to extract the SSID from the beacon and extract the identification information from the SSID, and a second network control unit configured to set the second wireless setting information as current wireless setting information of the second wireless terminal and establish a wireless connection with the first wireless terminal based on the identification information and the second wireless setting information.

BRIEF DESCRIPTION OF THE DRAWINGS

FIG. 3 is a table illustrating exemplary wireless setting information;

FIG. 4 is a table illustrating exemplary wireless setting information;

FIG. 5 is a table illustrating exemplary wireless setting information;

FIG. 6 is a drawing illustrating exemplary terminal identification information generated from a MAC address;

FIG. 7 is a drawing illustrating exemplary terminal identification information generated from a MAC address;

FIG. 8 is a drawing illustrating exemplary terminal identification information generated from a product serial number;

FIG. 9 is a drawing illustrating exemplary terminal identification information generated from a random number;

FIG. 10 is a drawing used to describe an exemplary method of generating an SSID;

FIG. 11 is a drawing illustrating an example of a default device name;

DESCRIPTION OF THE PREFERRED EMBODIMENTS

Figure 1:
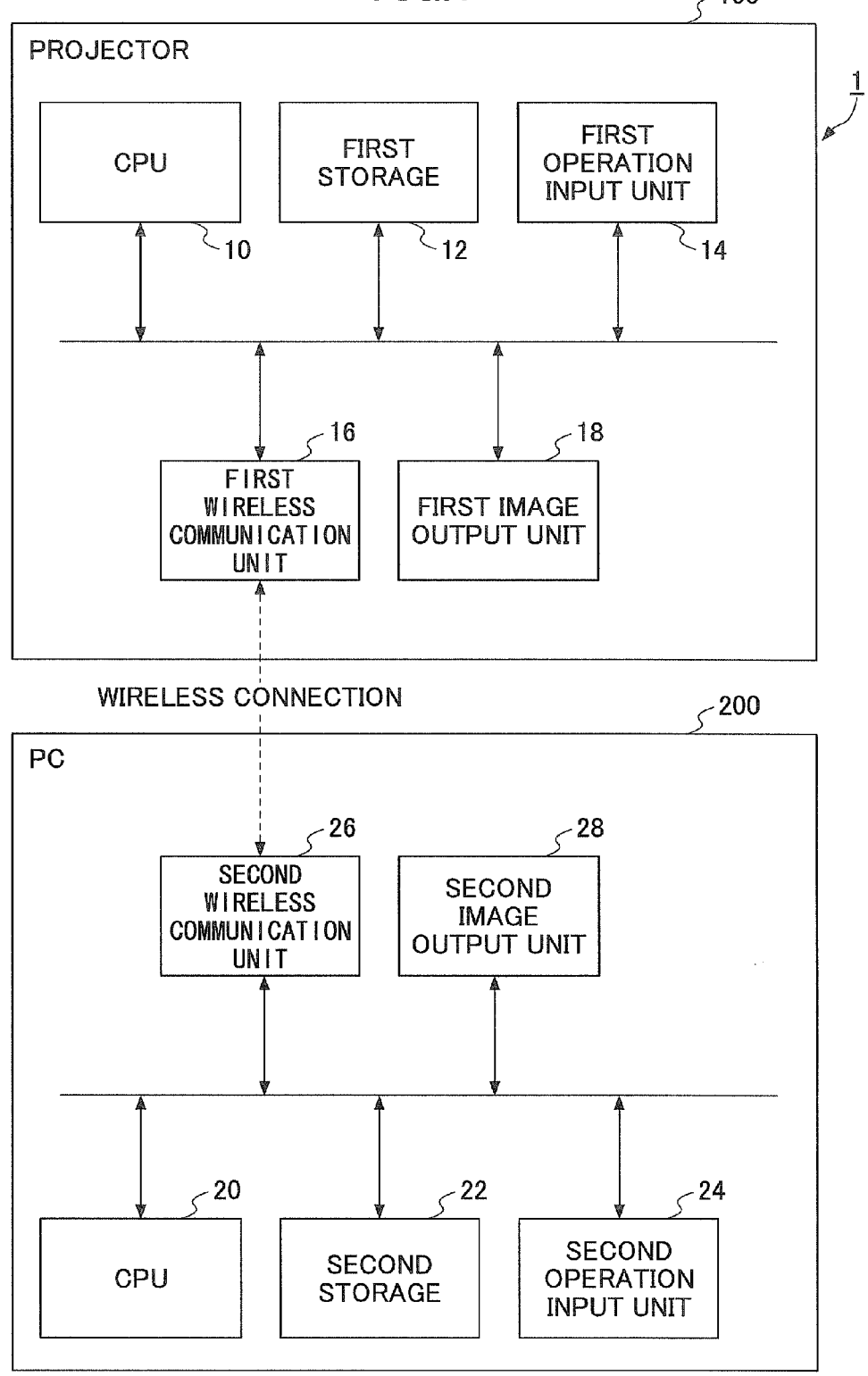
FIG. 1 is a drawing illustrating an exemplary hardware configuration of a wireless communication system according to an embodiment.

Preferred embodiments of the present invention are described below with reference to the accompanying drawings. In the drawings, the same reference numbers may be assigned to components having the same or similar functions, and overlapping descriptions of those components may be omitted.

In a wireless communication system according to an embodiment, a "connected" wireless terminal, which is to be connected to a "connecting" wireless terminal that requests a connection to the "connected" wireless terminal, and the "connecting" wireless terminal wirelessly communicates with each other. In the wireless communication system, a first wireless terminal (or "connected" wireless terminal) uses predetermined wireless setting information including, for example, an IP address and a subnet mask, and generates a service set identifier (SSID) that includes a unique terminal identifier for uniquely identifying the first wireless terminal. The first wireless terminal transmits or broadcasts a beacon including the SSID that is used by a second wireless terminal (or "connecting" wireless terminal) when establishing a wireless connection with the first wireless terminal. With the configuration described above, the wireless communication system makes it possible to set wireless network parameters automatically or through simple operations.

Also according to the present embodiment, the SSID does not include an IP address. This in turn makes it possible to establish a wireless connection based on the SSID even when an IPv6 address that is longer than an IPv4 address is used. That is, the present embodiment makes it possible to establish a wireless connection based on the SSID regardless of whether IPv4 or IPv6 is used as a wireless communication protocol.

According to the present embodiment, the first ("connected") wireless terminal includes a first storage for storing predetermined first wireless setting information, and the second ("connecting") wireless terminal includes a second storage for storing second wireless setting information corresponding to the first wireless setting information. Here, "corresponding to" indicates that the first wireless setting information and the second wireless setting information are "common information" shared by the first wireless terminal and the second wireless terminal. Also, being "common information" includes a case where the first wireless setting information and the second wireless setting information are the same, and a case where one of the first wireless setting information and the second wireless setting information can be obtained by converting the other one of them according to a predetermined method.

Thus, the present embodiment makes it possible to reduce the amount of wireless setting information to be exchanged between the first ("connected") wireless terminal and the second ("connecting") wireless terminal to establish a wireless connection, and thereby makes it possible to reduce time necessary to exchange the wireless setting information. Accordingly, the present embodiment makes it possible to construct a wireless communication system that can improve user convenience and reduce time necessary to establish a wireless connection. Also, the present embodiment makes it possible to reduce the probability that a process of establishing a wireless connection fails due to communication packets failed to reach a counterpart wireless terminal. A wireless communication system according to the present embodiment is described below in more detail.

<<Configuration of Wireless Communication System>>
<Hardware Configuration of Wireless Communication System>

An exemplary hardware configuration of a wireless communication system 1 according to the present embodiment is described below with reference to FIG. 1.

The wireless communication system 1 may include a projector 100 including a wireless communication function and a personal computer (PC) 200 such as a notebook PC including a wireless communication function. The projector 100 and the PC 200 are connected with each other via a wireless network. In the wireless communication system 1 of the present embodiment, the projector 100 is an example of a first ("connected") wireless terminal and the PC 200 is an example of a second ("connecting") wireless terminal. Any other types of devices may also be used as the first ("connected") wireless terminal and the second ("connecting") wireless terminal. For example, when the wireless communication system 1 is implemented as an electronic conference system, an electronic bulletin board may correspond to the "connected" wireless terminal and a PC may correspond to the "connecting" wireless terminal. In this case, the PC can be directly and quickly connected to the electronic bulletin board and other display devices. Also, the wireless communication system 1 of the present embodiment may be applied to a printing system including a printer as the "connected" wireless terminal and a PC as the "connecting" wireless terminal. In this case, the PC can quickly find the printer to be connected and print a document on the printer.

The projector 100 may include a central processing unit (CPU) 10, a first storage 12, a first operation input unit 14, a first radio communication unit 16, and a first image output unit 18. The CPU 10 controls the entire projector 100. For example, the CPU 10 executes programs stored in the first storage 12 to perform processes to control other components of the projector 100. The programs may be provided in a storage medium and installed via a driver (not shown) into the first storage 12. The programs may also be downloaded from a network and installed in the first storage 12. The first storage 12 may be implemented, for example, by a random access memory (RAM), a read-only memory (ROM), and/or a hard disk drive (HDD).

The first operation input unit 14 receives information and instructions from the user. The first wireless communication unit 16 sends and receives information via wireless communications to and from a second wireless communication unit 26 of the PC 200. For example, the first wireless communication unit 16 transmits or broadcasts a beacon including an SSID. The first image output unit 18 projects an image sent from the PC 200 onto a display unit such as a screen.

The PC 200 may include a CPU 20, a second storage 22, a second operation input unit 24, a second radio communication unit 26, and a second image output unit 28. The CPU 20 controls the entire PC 200. For example, the CPU 20 executes programs stored in the second storage 22 to perform processes to control other components of the PC 200. The programs may be provided in a storage medium and installed via a driver (not shown) into the second storage 22. The programs may also be downloaded from a network and installed in the second storage 22. The second storage 22 may be implemented, for example, by a random access memory (RAM), a read-only memory (ROM), and/or a hard disk drive (HDD).

The second operation input unit 24 receives information and instructions from the user. For example, the second operation input unit 24 may be implemented by a touch panel, a mouse, and/or a keyboard.

The second wireless communication unit 26 receives a beacon from the first wireless communication unit 16 of the projector 100. The second wireless communication unit 26 also sends and receives other information to and from the first wireless communication unit 16. The second image output unit 28 displays an image stored in the PC 200 on a display unit such as a liquid-crystal display.

<Software Configuration of Wireless Communication System>

Figure 2:
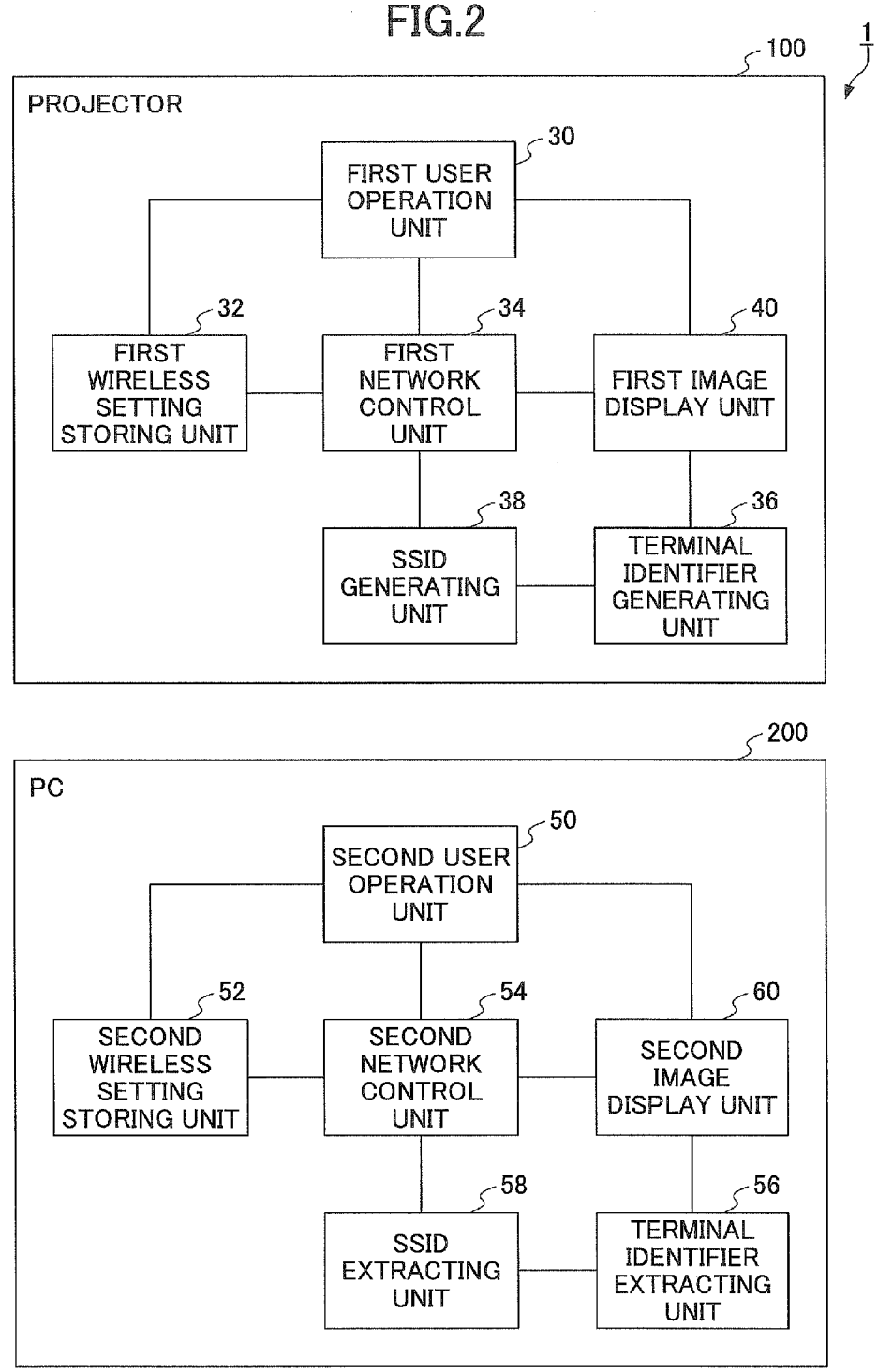
FIG. 2 is a drawing illustrating an exemplary software configuration of a wireless communication system according to an embodiment.

An exemplary software configuration of the wireless communication system 1 according to the present embodiment is described below with reference to FIG. 2. The projector 100 may include a first user operation unit 30, a first wireless setting storing unit 32, a first network control unit 34, a terminal identifier generating unit 36, an SSID generating unit 38, and a first image display unit 40.

The first user operation unit 30 enables the user to input information and instructions.

The first wireless setting storing unit 32 stores predetermined wireless setting information (common information) used for wireless communications. The first wireless setting storing unit 32 corresponds to a first storing unit for storing first wireless setting information corresponding to second wireless setting information stored in the PC 200.

When the projector 100 is powered on, the first network control unit 34 sets present wireless communication parameters as current wireless setting information (or common information). Meanwhile, when establishing a wireless connection, the first network control unit 34 changes the current wireless setting information to the first wireless setting information if the current wireless setting information is different from the first wireless setting information. In other words, the first network control unit 34 sets the first wireless setting information as the current wireless setting information of the projector 100. Still in other words, the first network control unit 34 sets wireless communication parameters of the projector 100 based on the first wireless setting information.

The terminal identifier generating unit 36 generates identification information (terminal identifier) for uniquely identifying the projector 100 in wireless communications. For example, the terminal identifier generating unit 36 uses a wireless LAN media access control (MAC) address, a value obtained by converting the MAC address, a product serial number of the projector 100, a value obtained by converting the product serial number, or a random number as the identification information. The identification information may be unique to the projector 100 within a wireless communication range of the projector 100. That is, the identification information may be unique to the projector 100 to such an extent that there is no or an extremely low possibility that the same identification information is used by another wireless terminal in the wireless communication range of the projector 100 and no practical problem is caused.

The SSID generating unit 38 generates an SSID including the identification information generated by the terminal identifier generating unit 36. The terminal identifier generating unit 36 and the SSID generating unit 38 correspond to a generating unit that generates an SSID including identification information for uniquely identifying a first wireless terminal in wireless communications.

As described above, an SSID can contain up to bytes of information. Therefore, if the SSID is configured to include an IP address and IPv6 is used as the wireless communication protocol, information other than an IPv6 address cannot be included in the SSID. Accordingly, a wireless communication method where an IP address is included in the SSID cannot be used when IPv6 is used as the wireless communication protocol.

Meanwhile, according to the present embodiment, no IP address is included in the SSID. Accordingly, the present embodiment may be applied to the current environment where both IPv4 and IPv6 addresses are used and also to a future environment where only IPv6 addresses are used. The SSID may also include a network identifier used in a wireless LAN conforming to IEEE 802.11 standards. The SSID and a method of generating the SSID are described later in detail.

The first image display unit 40 displays images and the identification information of the projector 100. The first image display unit 40 corresponds to a first display unit for displaying selection information for selecting the projector 100 from multiple projectors. The first display unit may be configured to display the entire information or a part of the information in the SSID as the selection information for selecting the projector 100.

The PC 200 may include a second user operation unit 50, a second wireless setting storing unit 52, a second network control unit 54, a terminal identifier extracting unit 56, an SSID extracting unit 58, and a second image display unit 60. The second user operation unit 50 enables the user to input information and instructions.

The second wireless setting storing unit 52 stores predetermined wireless setting information (common information) used for wireless communications. The second wireless setting storing unit 52 corresponds to a second storing unit for storing second wireless setting information corresponding to the first wireless setting information stored in the projector 100. When multiple projectors 100 exist in the wireless communication system 1, the second wireless setting storing unit 52 may store multiple sets of second wireless setting information in association with terminal identifiers (unique identification information) of the projectors 100.

The second network control unit 54 establishes a wireless connection with the projector 100 based on the identification information of the projector 100 and the second wireless setting information. When the PC 200 is powered on, the second network control unit 54 sets present wireless communication parameters as current wireless setting information. Meanwhile, when establishing a wireless connection, the second network control unit 54 changes the current wireless setting information to the second wireless setting information if the current wireless setting information is different from the second wireless setting information. In other words, the second network control unit 54 sets the second wireless setting information as the current wireless setting information of the PC 200. Still in other words, the second network control unit 54 sets the wireless communication parameters of the PC 200 based on the second wireless setting information. When multiple projectors 100 exist in the wireless communication system 1, the second network control unit 54 may be configured to identify second wireless setting information corresponding to the first wireless setting information of a selected projector 100 based on the terminal identifier (unique identification information) in the SSID included in the beacon received from the selected projector 100.

The SSID extracting unit 58 extracts an SSID from a beacon. The terminal identifier extracting unit 56 extracts the identification information of the projector 100 from the SSID, The SSID extracting unit 58 and the terminal identifier extracting unit 56 may be collectively referred to as an extracting unit.

The second image display unit 60 displays a part or the whole of the identification information in the SSID, and may be referred to as a (second) display unit. When there are multiple projectors 100, the second image display unit 60 may display a list of multiple sets of identification information for identifying the projectors 100. The list may be referred to as "selection information" from which the user can select one of the projectors 100 to be connected to the PC 200. The second image display unit 60 may also display other images and information.

<<Wireless Setting Information>>

The first wireless setting storing unit 32 and the second wireless setting storing unit 52 store, respectively, the first wireless setting information and the second wireless setting information that are common information shared by the projector 100 and the PC 200. FIGS. 3 through 5 illustrate examples of the first and second wireless setting information (common information).

As illustrated in FIGS. 3 through 5, the first wireless setting storing unit 32 stores the first wireless setting information including wireless communication parameters such as a wireless communication mode, an authentication method, an encryption method, a wireless communication protocol, and an IP address of the projector 100 (i.e., the "connected" wireless terminal).

Similarly, the second wireless setting storing unit 52 stores the second wireless setting information including wireless communication parameters such as a wireless communication mode, an authentication method, an encryption method, a wireless communication protocol, and an IP address of the projector 100 that correspond to the wireless communication parameters in the first wireless setting information.

The wireless communication mode may be set to an ad-hoc mode where wireless communications are performed without using an access point, or an infrastructure mode where wireless communications are performed via an access point.

Various known technologies may be used for the authentication method and the encryption method. Examples of known encryption methods include Wired Equivalent Privacy (WEP) and Wi-Fi Protected Setup (WPS). The first wireless communication unit 16 encrypts the character string of a generated SSID. The second wireless communication unit 26 decrypts the SSID included in a beacon.

The wireless communication protocol may be set to IPv4 or IPv6, or even to a proprietary protocol. In FIGS. 3 and 4, IPv4 is set as the wireless communication protocol. In FIG. 5, IPv6 is set as the wireless communication protocol. When the wireless communication protocol is IPv4, an IPv4 address and an IPv4 subnet mask are set in the wireless setting information.

Meanwhile, when the wireless communication protocol is IPv6, an IPv6 address and an IPv6 address prefix are set in the wireless setting information. The IPv4 address and the IPv4 subnet mask are used as a pair and need to have corresponding values. Similarly, the IPv6 address and the IPv6 address prefix are used as a pair and need to have corresponding values.

The wireless setting information may also include a frequency channel and a network standard in addition to the above described wireless communication parameters. The network standard may specify one of IEEE 802 standards. Either a fixed value or a variable value specified by the user based on a result of frequency scanning (or frequency channel scanning) may be set as the frequency channel. In FIG. 3, the frequency channel is set to a fixed value. In FIG. 4, it is assumed that the frequency channel is to be specified by the user based on a result of frequency scanning. In this case, since the frequency channel is not fixed, it is possible to flexibly use a vacant frequency band.

In the present embodiment, it is assumed that the second wireless setting information is the same as the first wireless setting information. However, the second wireless setting information is not necessarily the same as the first wireless setting information as long as they correspond to each other. For example, the correspondence between the second wireless setting information stored in the PC 200 and the first wireless setting information stored in the projector 100 may be predetermined, and information on the correspondence may be reported to the PC 200 in advance. Also, multiple sets of wireless setting information (or wireless communication parameters) may be provided.

When the PC 200 is powered on, the second network control unit 54 sets present wireless communication parameters as current wireless setting information. Meanwhile, when establishing a wireless connection, the second network control unit 54 changes the current wireless setting information to the second wireless setting information if the current wireless setting information is different from the second wireless setting information.

Similarly, when the projector 100 is powered on, the first network control unit 34 sets present wireless communication parameters as current wireless setting information. When establishing a wireless connection, the first network control unit 34 changes the current wireless setting information to the first wireless setting information if the current wireless setting information is different from the first wireless setting information.

According to the related-art communication methods, because an IP address is dynamically assigned to a "connected" wireless terminal (i.e., not fixed), a "connecting" wireless terminal cannot identify the IP address of the "connected" wireless terminal. Therefore, the "connected" wireless terminal reports the assigned IP address via an SSID to the "connecting" wireless terminal. Accordingly, with the related-art communication methods, the projector 100 and the PC 200 need to exchange wireless communication parameters (i.e., wireless setting information) before establishing a wireless connection.

Meanwhile, according to the present embodiment, wireless communication parameters (common information) are stored beforehand in the projector 100 and the PC 200 as the first wireless setting information and the second wireless setting information. This approach makes it possible to automatically set wireless communication parameters in wireless terminals without requiring the wireless terminals to exchange wireless setting information before establishing a wireless connection. This in turn makes it possible to reduce time necessary to establish a wireless connection, and also makes it possible to reduce the probability that a process of establishing a wireless connection fails due to communication packets failed to reach a counterpart wireless terminal.

<<Terminal Identifier>>

Examples of terminal identifiers (identification information) generated by the terminal identifier generating unit 36 are described below with reference to FIGS. 6 through 9.

FIGS. 6 and 7 illustrate terminal identifiers generated based on a MAC address. A terminal identifier "001641ED1E5A" of FIG. 6 is a MAC address represented by ASCII codes. A terminal identifier "AABFDB54B5E0" of FIG. 7 is generated by converting a MAC address according to a predetermined method. As an example, the terminal identifier "AABFDB54B5E0" of FIG. 7 is obtained by replacing numeric characters with alphabet characters and replacing alphabet characters with numeric characters in the MAC address of FIG. 6 (e.g., A↔0, B↔1). Any method may be used to convert a MAC address as long as it is predetermined and known to wireless terminals to be connected to each other.

A terminal identifier "0404286-0E0" of FIG. 8 is a product serial number of the projector 100, which is represented by ASCII codes.

A random number may be used as a terminal identifier. A terminal identifier "1736895357798421" of FIG. 9 is a 16-digit random number.

Thus, a terminal identifier may be implemented by an existing number or generated based on an existing number.

<<Method of Generating SSID>>

An exemplary method of generating an SSID including a terminal identifier (identification information) generated by the terminal identifier generating unit 38 is described below with reference to FIG. 10. An SSID is composed of 32 bytes of information. In FIG. 10, 0th through 2nd bytes of the SSID contain a fixed character string indicating a wireless communication method of the present embodiment. 3rd through $5^{th}$ bytes contain information for identifying the first and second wireless setting information. For example, "001" indicates that the wireless setting information (setting 1) of FIG. 3 is used, "002" indicates that the wireless setting information (setting 2) of FIG. 4 is used, and "003" indicates that the wireless setting information (setting 3) of FIG. 5 is used. 6th through 19th bytes contain user-specified information specified by the user. In this example, a device name is set in 6th through 19th bytes. 20th through 31st bytes contain a terminal identifier generated by the terminal identifier generating unit 36. In this example, the MAC address of FIG. 6 is set in 20th through 31st bytes.

Since the maximum size of an SSID is 32 bytes, when, for example, 16 bytes are used for a terminal identifier as exemplified by FIG. 9, the number of bytes used for the user-specified information needs to be reduced. The correspondence between byte positions and information items described above with reference to FIG. 10 is just an example, and the correspondence between byte positions and information items may be determined in any other appropriate manner as long as it is known to both wireless terminals (e.g., the projector 100 and the PC 200) to be connected to each other. The value in 3rd through 5th bytes of the SSID may be omitted when only one set of wireless setting information is available. Also, the SSID generating unit 38 may be configured to generate an SSID that includes at least one of user-specified information, information for identifying wireless setting information (e.g., one of "001", "002", and "003"), and the device name of the "connected" wireless terminal.

According to the above described method of generating an SSID, the SSID always includes a unique terminal identifier and therefore the value of the SSID itself also becomes unique. In other words, there is no or an extremely low possibility that the same SSID is used by two or more wireless terminals. For example, an SSID may include a unique identifier such as a MAC address, a product serial number, or a device name assigned to each wireless terminal, or a combination of such unique identifiers. Accordingly, even when multiple projectors of the same type are present in a system, there is no or an extremely low possibility that the same SSID is used by the projectors.

FIG. 11 is a drawing illustrating an example of a default device name of the projector 100. In the example of FIG. 11, the last three digits "0E0" of the product serial number of the projector 100 in FIG. 8 are attached as a part of the device name at 11th through 13th bytes. Thus, according to the present embodiment, a default device name (or a default value of the device name) of the projector 100 includes a part of the product serial number of the projector 100. With this method, even when multiple projectors 100 are present, different default device names are assigned to the projectors 100 and the possibility that the same device name is used by two or more projectors 100 becomes extremely low. Also, when a part of the product serial number is combined with alphabet characters, the possibility that duplicate default device names are used becomes further lower. Further, when the MAC address is combined with a part of the product serial number, there is no possibility that duplicate default device names are used.

With the SSID generated as described above, even when multiple "connected" wireless terminals (e.g., projectors 100) are present in the system, the PC 200 can identify a target wireless terminal among the wireless terminals without requiring the user to specify the device name of the target wireless terminal.

According to the present embodiment, since the same SSID is not used for two or more projectors 100, the PC 200 can identify and connect to a target projector 100 based on the SSID and request the target projector 100 to project an image.

As described above, an SSID of the present embodiment includes information such as a device name and a MAC address for identifying the projector 100. If it is desirable to hide such identification information, the projector 100 may be configured to encode the identification information and the PC 200 may be configured to decode the identification information. Any method may be used to encode the identification information as long as it is known to both of the projector 100 and the PC 200.

<<Process Performed in Wireless Communication System>>

Next, an exemplary process performed in the wireless communication system 1 is described with reference to FIG. 12.

Figure 12:
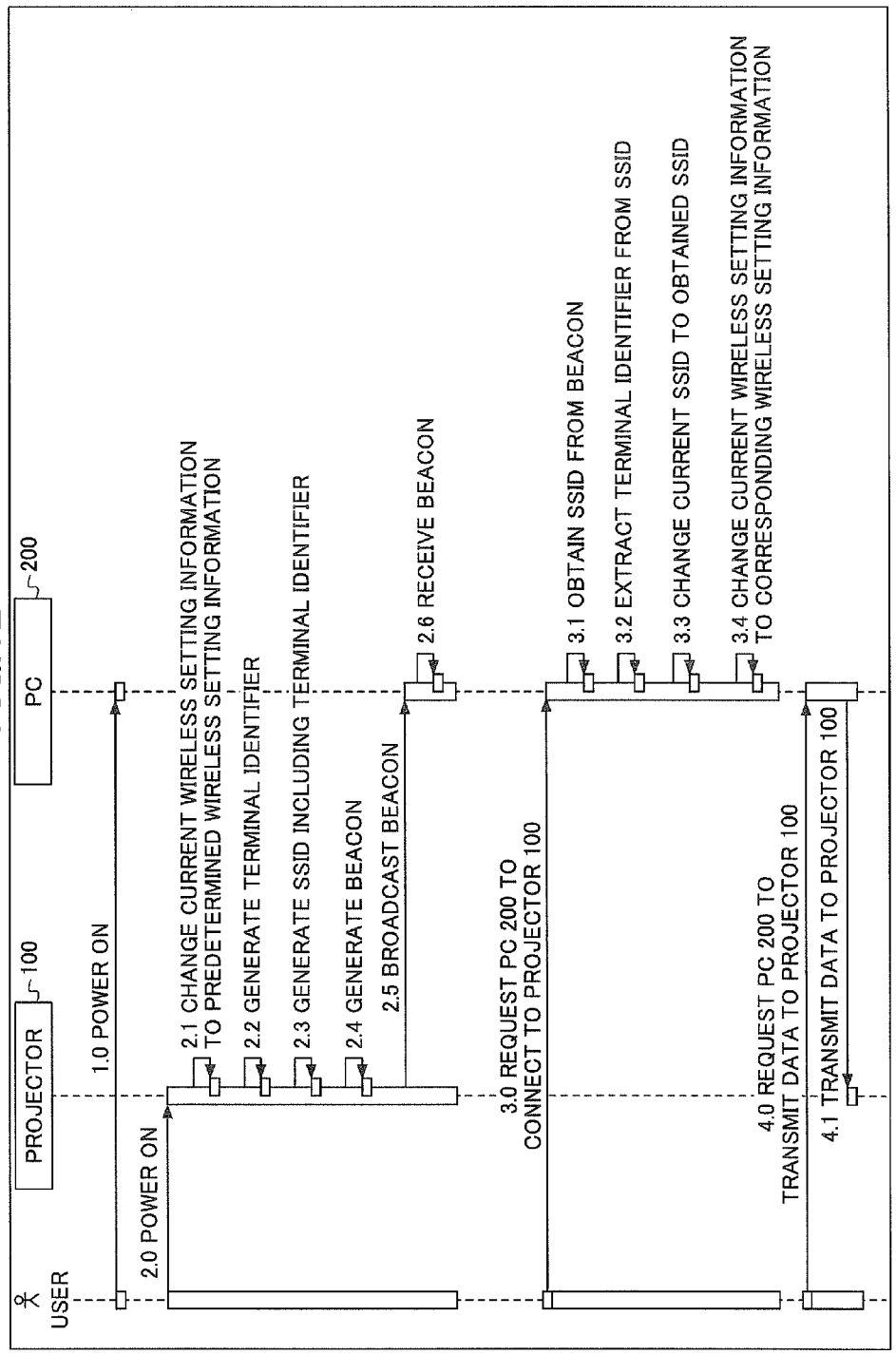
FIG. 12 is a sequence chart illustrating an exemplary process performed in a wireless communication system.

In FIG. 12, it is assumed that the user brings the PC 200 into a meeting room and connects the PC 200 to the projector 100 installed in the meeting room.

First, the user powers on the PC 200 (1.0), and then powers on the projector 100 (2.0).

The projector 100 changes the current wireless setting information to predetermined first wireless setting information (2.1), and generates a terminal identifier (2.2). Here, the current wireless setting information indicates wireless setting information that has already been set in the projector 100 (e.g., wireless setting information that is set when the projector 100 is powered on). Next, the projector 100 generates an SSID including the terminal identifier (2.3). Then, the projector 100 generates a beacon including the SSID (2.4), and broadcasts the generated beacon to the PC 200 and other wireless terminals (2.5).

The PC 200 receives the beacon (2.6). The user requests (or instructs) the PC 200 to wirelessly connect to the projector 100 (3.0). The PC 200 obtains the SSID from the beacon (3.1). Next, the PC 200 extracts the terminal identifier from the SSID (3.2). Then, the PC 200 changes the current SSID to the SSID obtained from the beacon (3.3). Here, the current SSID indicates an SSID that has already been set in the PC 200. Also, the PC 200 changes the current wireless setting information to second wireless setting information corresponding to the first wireless setting information (3.3). Here, the current wireless setting information indicates wireless setting information that has already been set in the PC 200 (e.g., wireless setting information that is set when the PC 200 is powered on). Based on the second wireless setting information, the PC 200 establishes a wireless connection with the projector 100.

After the wireless connection is established, the user requests the PC 200 to transmit an image (or data) to the projector 100 (4.0). In response to the request, the PC 200 transmits the image to the projector 100 (4.1). As a result, the image is projected by the projector 100.

<Selection of Projector>

Figure 14:
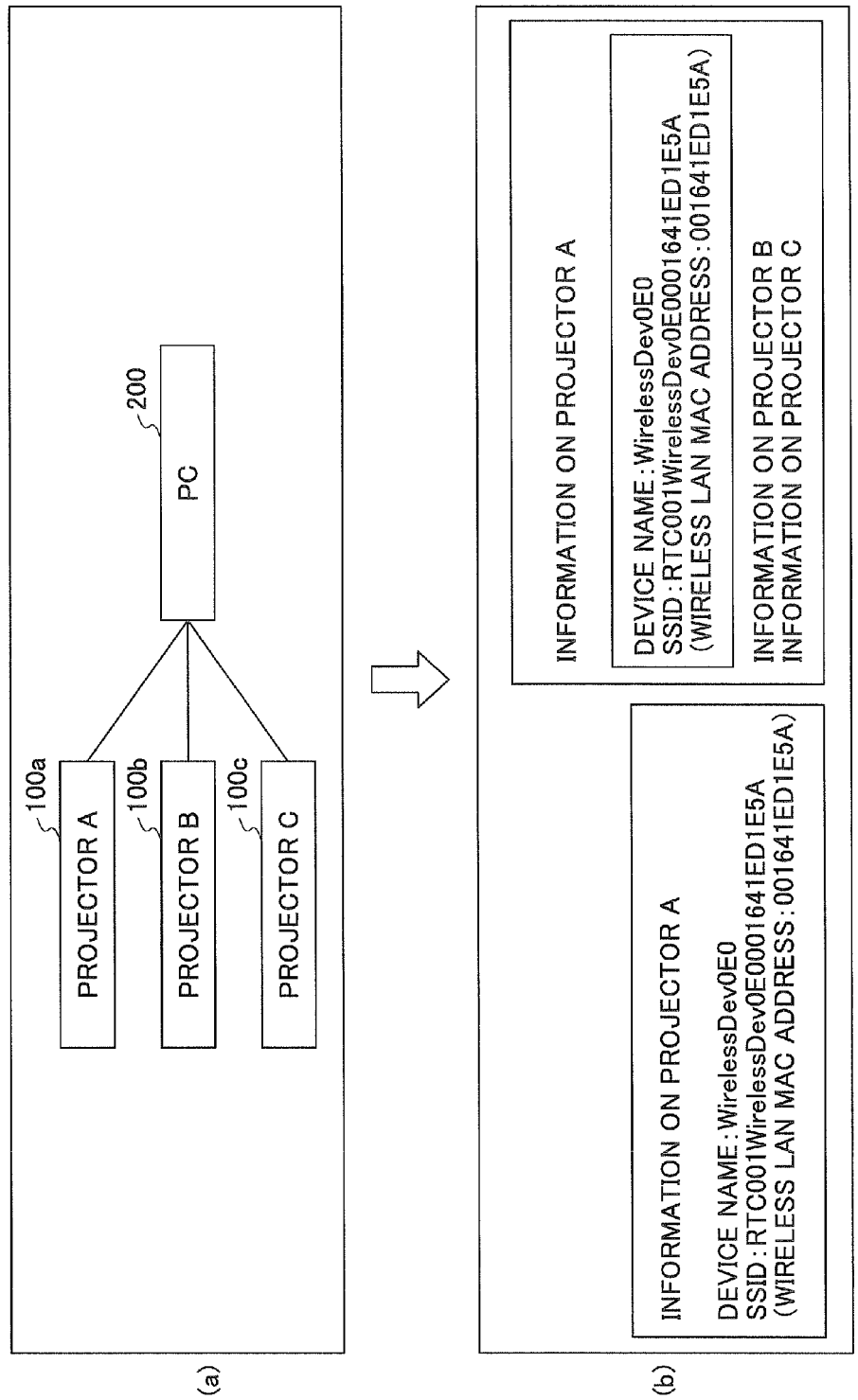
FIG. 14 is a drawing illustrating exemplary screens displayed on a projector and a PC.

Assuming that three projectors (projector A 100a, projector B 100b, and projector C 100c) are present as illustrated by FIG. 14 (*a*) within a wireless communication range of the PC 200 (i.e., a range where wireless signals from the projectors can reach the PC 200), the device name, the SSID, and the wireless LAN MAC address of each of the projector A 100a, the projector B 100b, and the projector C 100c are displayed on a screen of the PC 200.

The PC 200 obtains the SSID including the unique identification information of the projector A 100a from (the beacon broadcast by) the projector A 100a, and displays the information in the obtained SSID on a screen as illustrated by the left-hand part of FIG. 14 (*b*). Similarly, the PC 200 obtains the SSID including the unique identification information of the projector B 100b from the projector B 100b, obtains the SSID including the unique identification information of the projector C 100c from the projector C 100c, and displays the information in the obtained SSIDs on the screen. Thus, the PC 200 (an example of a "connecting" wireless terminal) of the present embodiment may be configured to obtain SSIDs from all "connected" wireless terminals within a radio communication range, and display information in the obtained SSIDs on a screen for the respective "connected" wireless terminals.

The PC 200 extracts information from the obtained SSIDs, and displays the information of the projector A 100a, the information of the projector B 100b, and the information of the projector C 100c as a list (selection information) as illustrated by the right-hand part of FIG. 14 (*b*). Each of the information of the projector A 100a, the information of the projector B 100b, and the information of the projector C 100c is selectable. In FIG. 14 (*b*), detailed information of the projector A 100a is displayed in a box. Alternatively, the detailed information may be displayed in a pop-up window.

The user can identify the projector A 100a, the projector B 100b, and the projector C 100c based on the information (identification information) displayed on the PC 100, and select one of them as a target projector to be connected to the PC 200. When one of the projectors is selected by the user, the PC 200 identifies the SSID corresponding to the selected projector, and requests wireless communications to the projector having terminal identifier in the identified SSID.

The above configuration makes it possible to quickly and automatically connect a "connecting" wireless terminal such as a PC to a "connected" wireless terminal such as a projector, and thereby makes it possible to quickly and smoothly project an image stored in the PC via the projector. In other words, the above configuration makes it possible to automatically start a process of establishing a wireless connection in response to a selection of a target wireless terminal by the user, and thereby makes it possible to reduce time necessary to establish a wireless connection.

In the example of FIG. 14 (*b*), the device name, the SSID, and the wireless LAN MAC address are displayed as unique identification information of the projector A 100a. However, information items displayed for each projector is not limited to those illustrated in FIG. 14 (*b*). For example, the product serial number of the projector may be displayed as unique identification information. Also, instead of displaying the entire SSID, only a part of the information in the SSID may be displayed. Also, a part or the whole of the terminal identifier in the SSID may be displayed.

In the example of FIG. 14 (*b*), the device name, the SSID, and the wireless LAN MAC address are displayed as unique identification information for the user to select a projector. In this case, because the SSID is a series of numeric and alphabet characters, it may be difficult for the user to identify a projector. Therefore, a part or the whole of the SSID may be replaced with more visually recognizable numbers for display, and different colors and fonts and highlights may be used for the SSID so that the user can more easily identify the projector.

For example, assuming that the first wireless setting information and the second wireless setting information include identification information "001" of a first meeting room where the projector 100 is installed, a part of the SSID displayed on the PC 200 may be replaced with the identification information "001" and the identification information "001" may be expressed in a bold face. This makes it easier for the user to select a target projector.

<Process of Terminating Wireless Connection>

Figure 15:
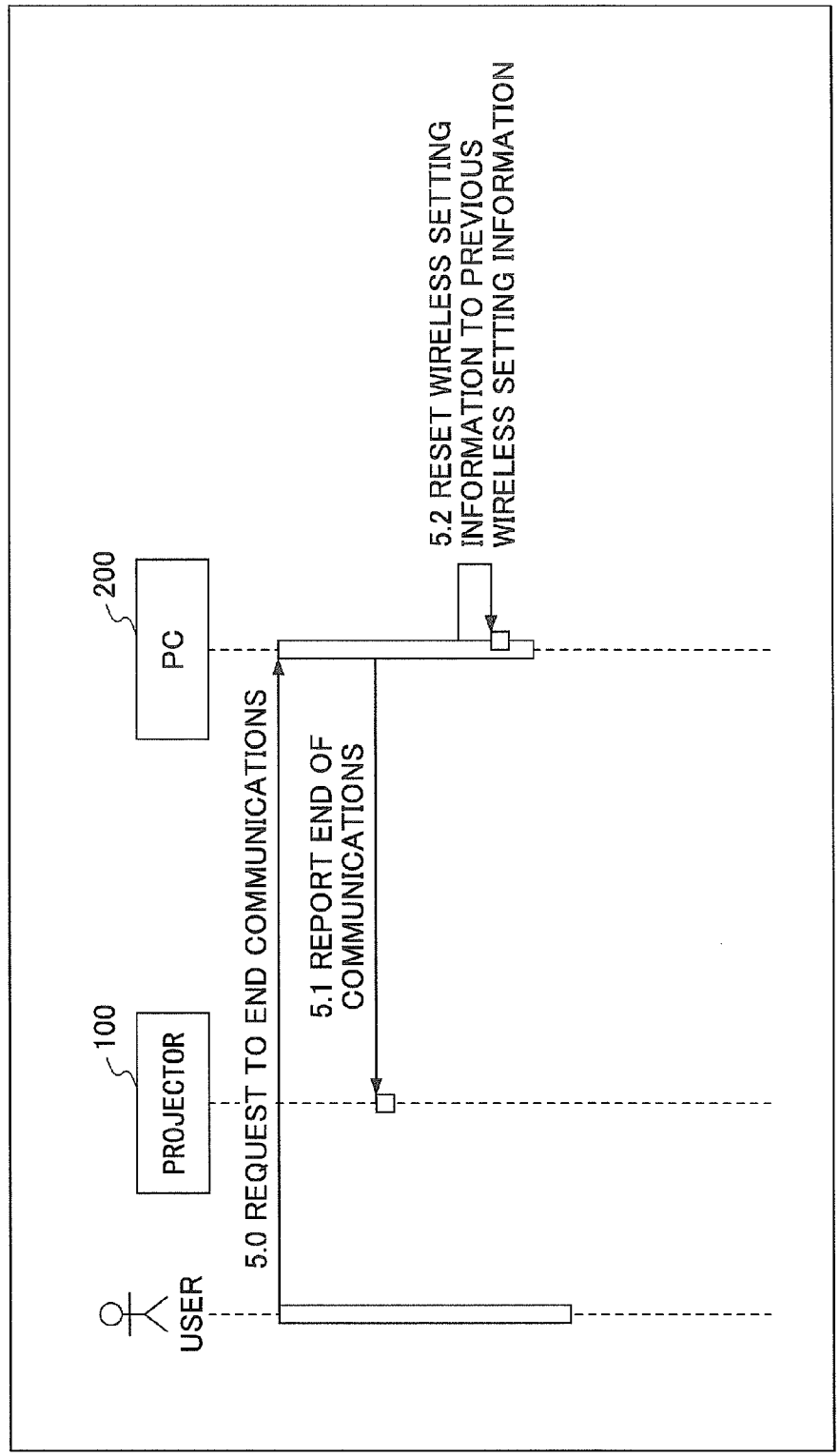
FIG. 15 is a sequence chart illustrating an exemplary process performed in a wireless communication system when terminating a connection.

An exemplary process of terminating a wireless connection is described below with reference to FIG. 15.

When the user requests the PC 200 to end communications (5.0), the PC 200 reports the end of communications to the projector 100 (5.1). The PC 200 (the second network control unit 54) also resets the current wireless setting information (i.e., the second wireless setting information) to the previous wireless setting information (which had been set as the current wireless setting information before being changed to the second wireless setting information).

By changing the current wireless setting information from the second wireless setting information to the previous wireless setting information, the PC 200 can be connected again to a network to which the PC 200 was originally connected.

<Process Performed when Duplicate IP Addresses Exist>

Figure 13:
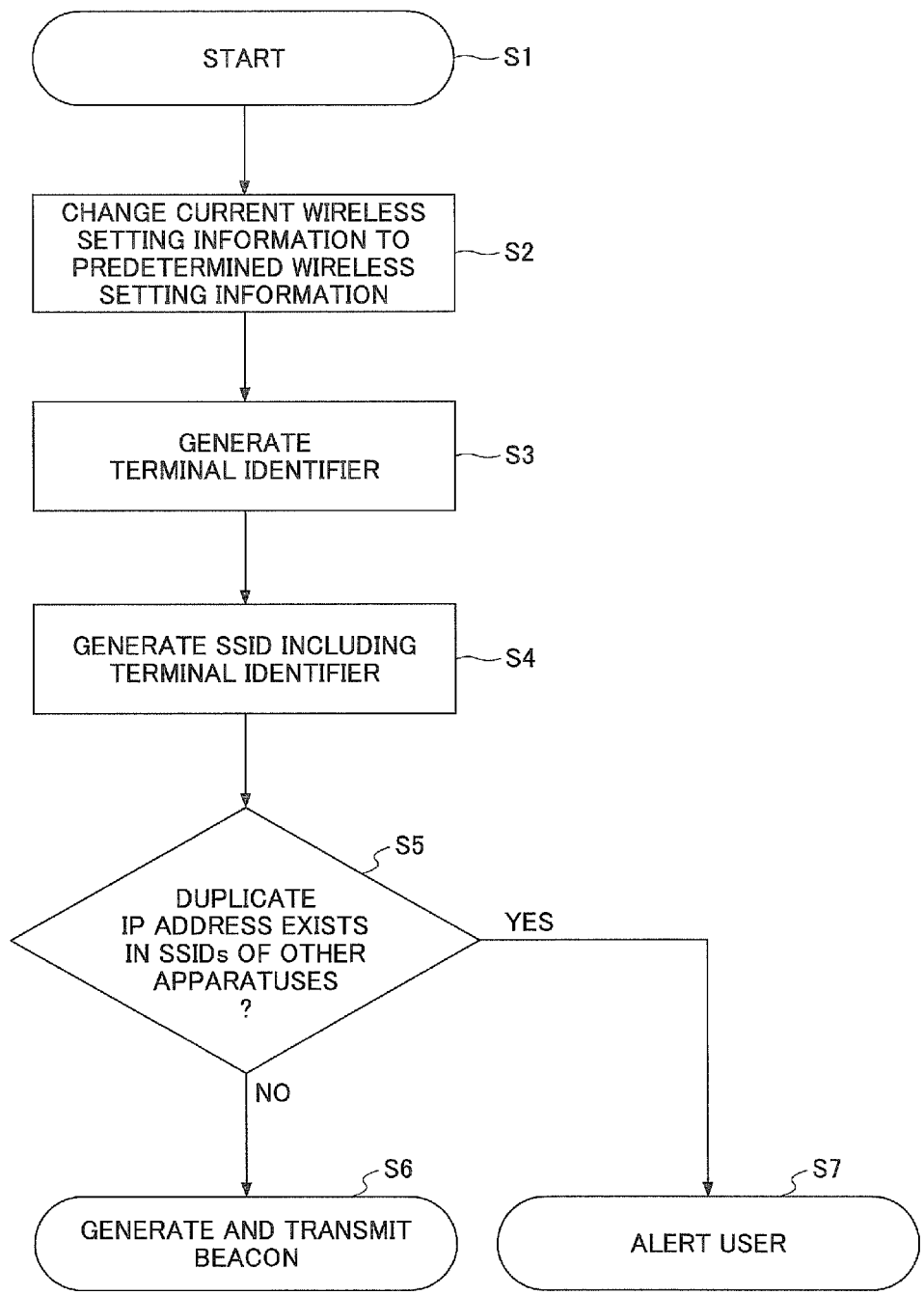
FIG. 13 is a flowchart illustrating an exemplary process performed when duplicate IP addresses exist.

In the wireless communication system 1 of the present embodiment, wireless terminals of the same type have different SSIDs and there is substantially no possibility that a communication failure occurs due to duplicate IP addresses. Also in the wireless communication system 1, even the possibility that the same IP address is used by wireless terminals of different types is very low. Still, however, it is preferable to have a preventive measure in case duplicate IP addresses are used. An exemplary process performed when duplicate IP addresses exist is described below with reference to FIG. 13.

When the process is started (S1), the projector 100 changes the current wireless setting information to predetermined first wireless setting information (S2), generates a terminal identifier (S3), and generates an SSID including the terminal identifier (S4). Assuming that the wireless communication protocol is IPv4 or IPv6, the projector 100 determines whether its IPv4/IPv6 address (i.e., the IP address in the first wireless setting information) exists in SSIDs in beacons broadcast by other wireless terminals (S5). Alternatively, the projector 100 may be configured to determine whether a duplicate IPv4/IPv6 exists by trying to communicate with other wireless terminals using its own IPv4/IPv6 address. In this case, if a response is returned from any one of the other wireless terminals, the projector 100 determines that the IPv4/IPv6 address is already in use. Meanwhile, when no response is returned from the other wireless terminals, the projector 100 determines that the IPv4/IPv6 address is not being used (i.e., there is no duplicate address).

When there is no duplicate IPv4/IPv6 address (NO at S5), the projector 100 generates a beacon including the SSID and transmits the beacon (S6). Meanwhile, when a duplicate IPv4/IPv6 address is found (YES at S5), the projector 100 alerts the user that a wireless connection cannot be established with the current IPv4/IPv6 address (S7).

The above process makes it possible to prevent a communication failure resulting from duplicate IP addresses. Steps S5-S7 of FIG. 13 may be performed by the first network control unit 34.

<Process of Switching Projectors>

An exemplary process of switching target projectors used to project an image sent from the PC 200 is described below with reference to FIG. 16.

Steps 2.1 through 2.6 (related to the projector A 100*a*) performed after steps 1.0 and 2.0 (power on) and steps 2.8 through 2.13 (related to the projector B 100*b*) performed after step 2.7 (power on) are substantially the same as steps 2.1 through 2.6 in FIG. 12, and therefore their descriptions are omitted here. That is, step 3.0 and the following steps are performed after beacons are generated and broadcast by the projector A 100*a* and the projector B 100*b*, and received by the PC 200.

When the user requests the PC 200 to connect to a projector (3.0), the PC 200 obtains SSIDs from the received beacons (3.1). Here, it is assumed that SSIDs are obtained from the beacons in the order the beacons are received.

Next, the PC 200 extracts terminal identifiers from the SSIDs (3.2). Here, it is assumed that the SSID including a terminal identifier 1 of the projector A 100*a* is obtained first. In this case, the PC 200 changes the current SSID to the SSID of the projector A 100*a* including the terminal identifier 1 (3.3). Also, the PC 200 changes the current wireless setting information to wireless setting information that is stored beforehand in the PC 200 and corresponds to the wireless setting information of the projector A 100*a* (3.3). Based on the changed wireless setting information, the PC 200 establishes a wireless connection with the projector A 100*a*.

Then, the PC 200 displays a list of projectors (or terminal identifiers) including the projector A 100*a* and the projector B 100*b* (3.5). The user selects the projector B 100*b* and thereby requests the PC 200 to wirelessly connect to the projector B 100*b* (4.0). In response, the PC 200 changes the current SSID to the SSID of the projector B 100*b* including the terminal identifier (4.1). Next, the PC 200 changes the current wireless setting information to wireless setting information that is stored beforehand in the PC 200 and corresponds to the wireless setting information of the projector B 100*b* (4.2). Based on the changed wireless setting information, the PC 200 establishes a wireless connection with the projector B 100*b*.

The user requests the PC 200 to transmit an image (or data) to the projector B 100*b* (5.0), and then the PC 200 transmits the image to the projector B 100*b* (5.1). As a result, the image is projected by the projector B 100*b*.

<Process of Switching PCs>

An exemplary process of switching PCs that transmit images to the projector 100 is described below with reference to FIG. 17.

Figure 17:
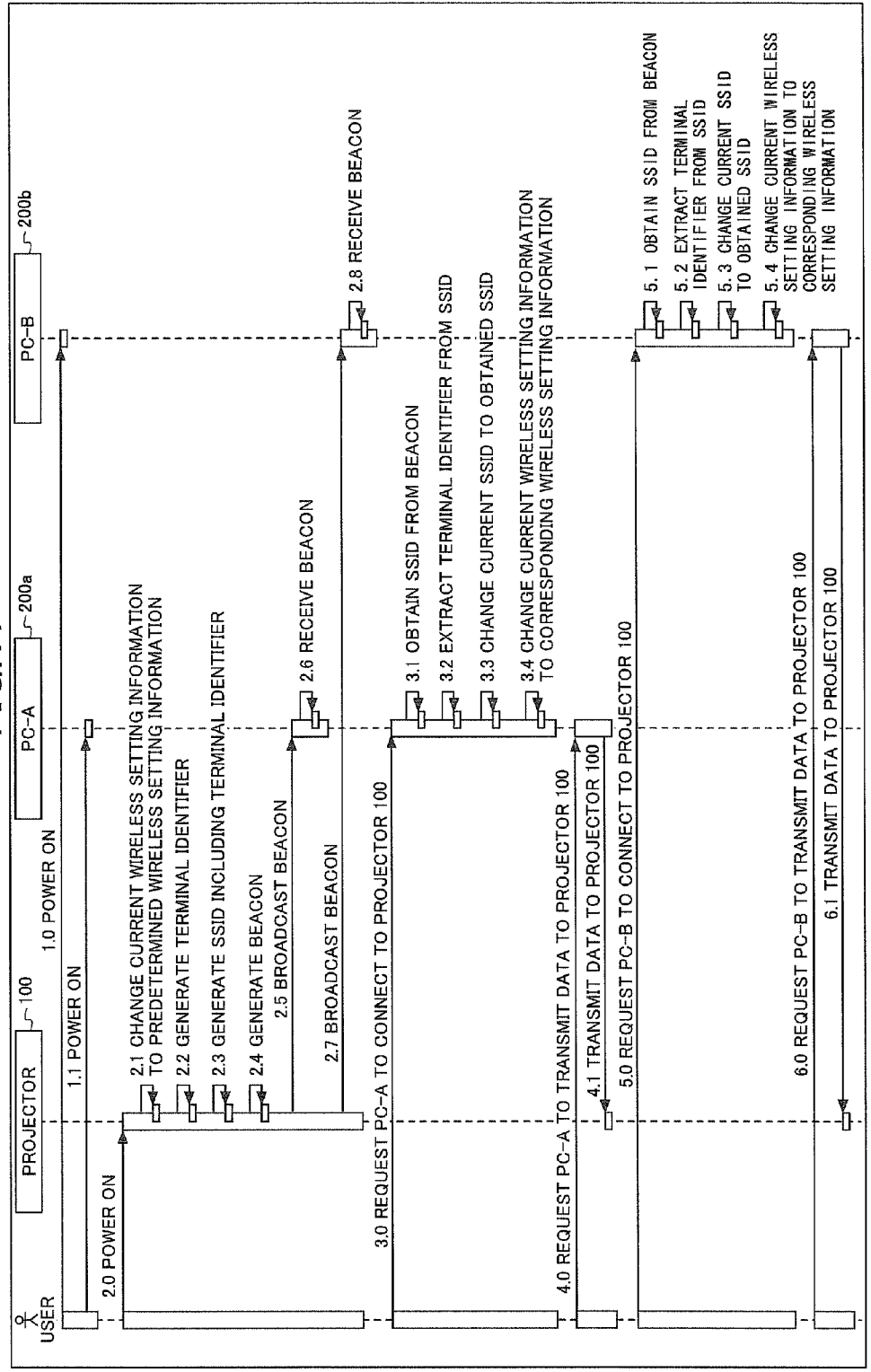
FIG. 17 is a sequence chart illustrating an exemplary process performed in a wireless communication system including multiple PCs.

In the process of FIG. 17, steps 3.0 through 4.1 of FIG. 12 are performed by each of a PC-A 200*a* and a PC-B 200*b* after a beacon transmitted from the projector 100 is received by the PC-A 200*a* and the PC-B 200*b*. Steps 1.0 through 2.4 are substantially the same as the corresponding steps in FIG. 12, and therefore their descriptions are omitted here.

In FIG. 17, the projector 100 transmits (or broadcasts) a beacon (2.5, 2.7), and each of the PC-A 200*a* and the PC-B 200*b* receives the beacon (2.6, 2.8).

When the user requests the PC-A 200*a* to connect to the projector 100 (3.0), the PC-A 200*a* obtains an SSID from the beacon (3.1), extracts a terminal identifier from the SSID (3.2), changes the current SSID to the obtained SSID (3.3), and changes the current wireless setting information to wireless setting information corresponding to the wireless setting information of the projector 100 (3.4). Based on the changed wireless setting information, the PC-A 200*a* establishes a wireless connection with the projector 100.

Then, the user requests the PC-A 200*a* to transmit an image (or data) to the projector 100 (4.0), and the PC-A 200*a* transmits the image to the projector 100 to cause the projector 100 to project the image (4.1).

Similarly, when the user requests the PC-B 200*b* to connect to the projector 100, steps 5.0 through 5.4 and steps 6.0 and 6.1 are performed in substantially the same manner as steps 3.0 through 3.4 and steps 4.0 and 4.1. That is, the PC-B 200*b* also establishes a wireless connection with the projector 100 and causes the projector 100 to project an image.

<Process of Selecting Projector>

In the process of FIG. 12, it is assumed that only one projector 100 is present near the PC 200 and therefore the PC 200 is automatically connected to the projector 100 having a terminal identifier extracted from an SSID that is obtained first. That is, the user is not requested to select a projector from a list displayed on the PC 200.

Figure 18:
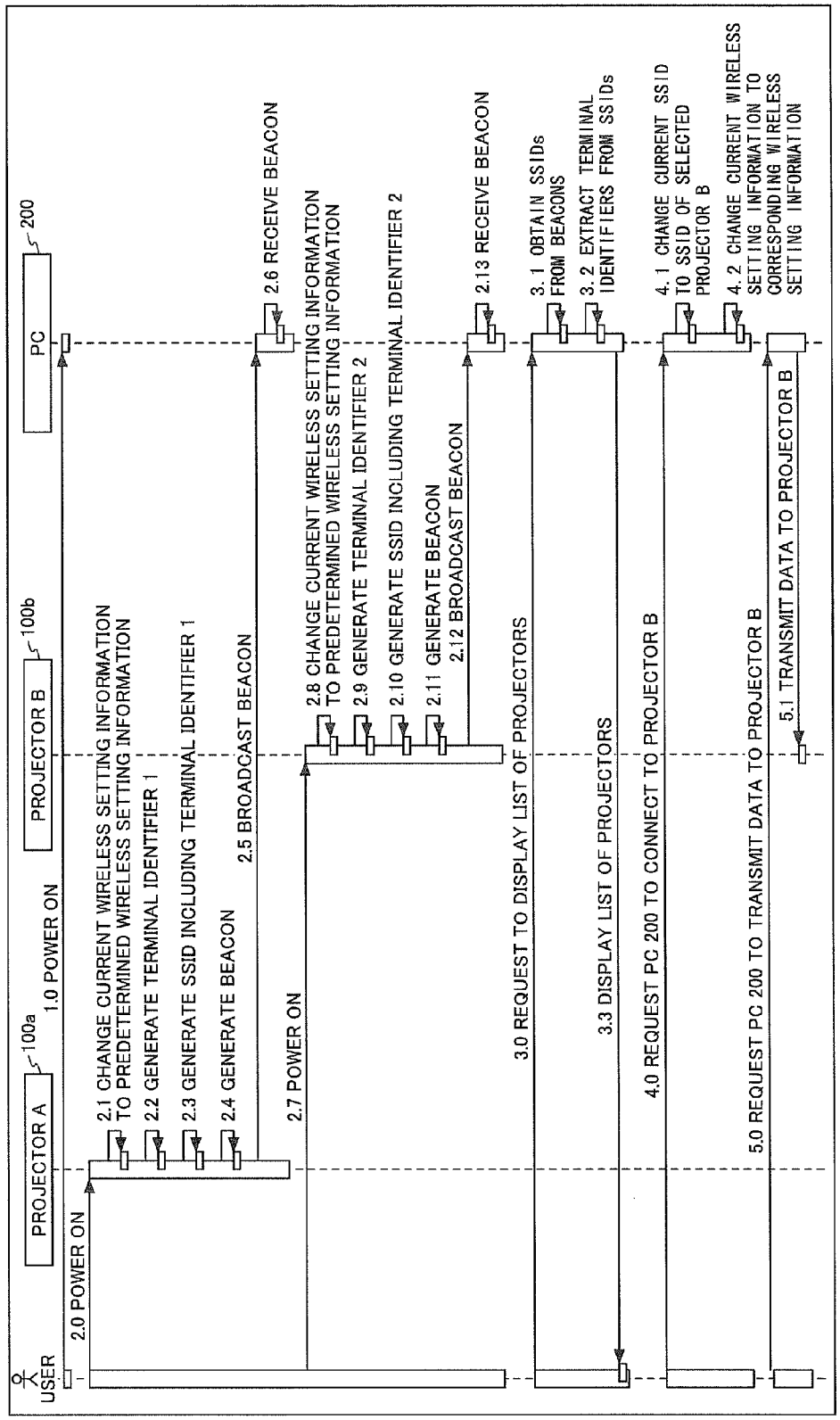
FIG. 18 is a sequence chart illustrating an exemplary process performed in a wireless communication system where a user specifies a projector to be connected.

In FIG. 18, it is assumed that multiple projectors are present near the PC 200 and the user selects one of the projectors to be connected to the PC 200.

Figure 16:
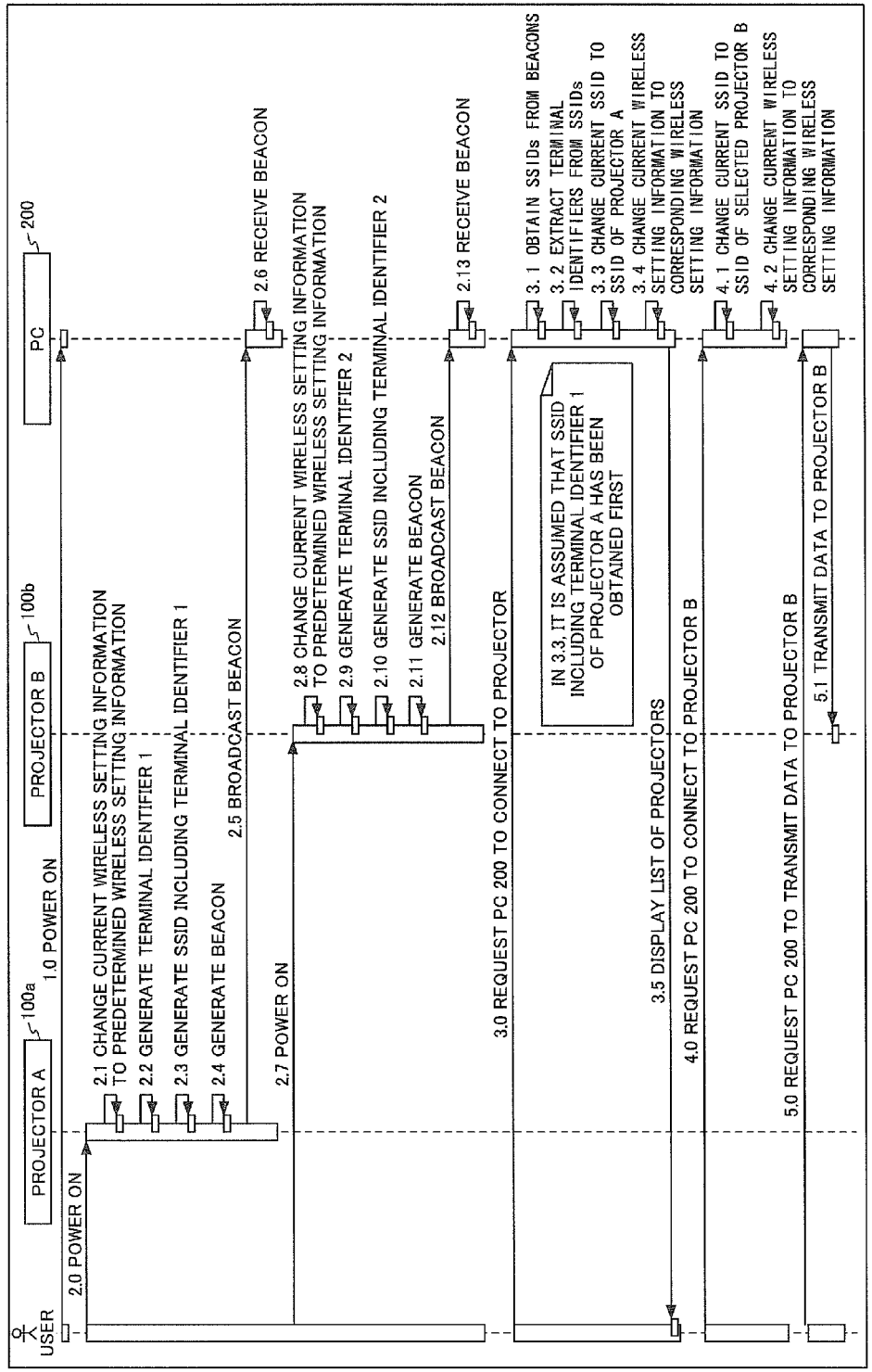
FIG. 16 is a sequence chart illustrating an exemplary process performed in a wireless communication system including multiple projectors.

Steps 1.0 and 2.0 through 2.13 of FIG. 18 are substantially the same as the corresponding steps of FIG. 16 and therefore their descriptions are omitted here. In FIG. 18, after step 2.13, the user requests the PC 200 to display a list of projectors (3.0). In response, the PC 200 obtains an SSID from a beacon received from the projector A 100*a* and obtains an SSID from a beacon received from the projector B 100*b* (3.1). Then, the PC 200 extracts terminal identifiers 1 and 2 of the projector A 100*a* and the projector B 100*b* from the obtained SSIDs, and displays the terminal identifiers 1 and 2 on a screen as a list (3.3).

When the user selects the terminal identifier 2 of the projector B 100*b* from the list to request the PC 200 to connect to the projector B 100*b* (4.0), the PC 200 changes the current SSID to the SSID of the projector B 100*b* including the terminal identifier 2 (4.1), and also changes the current wireless setting information to wireless setting information that is stored beforehand in the PC 200 and corresponds to the wireless setting information of the projector B 100*b* (4.2). Based on the changed wireless setting information, the PC 200 establishes a wireless connection with the projector B 100*b*. Then, the user requests the PC 200 to transmit an image (or data) to the projector B 100*b* (5.0), and the PC 200 transmits the image to the projector B 100*b* (5.1).

EFFECTS

As described above, according to the present embodiment, a first ("connected") wireless terminal transmits a beacon including an SSID at predetermined or regular intervals and a second ("connecting") wireless terminal receives the beacon. Since the beacon is transmitted at predetermined or regular intervals, the second ("connecting") wireless terminal does not need to obtain connection information including the SSID of the first ("connected") wireless terminal by active scanning that consumes much time. This makes it possible to quickly establish a wireless connection. Also in the present embodiment, wireless communication parameters (common information) necessary to establish a wireless connection are stored as first wireless setting information and second wireless information in the corresponding storage areas of the first ("connected") wireless terminal and the second ("connecting") wireless terminal. This configuration makes it possible to reduce the number of times that the information used to establish a wireless connection needs to be exchanged between the first ("connected") wireless terminal and the second ("connecting") wireless terminal. Accordingly, this makes it possible to reduce the time necessary to establish a wireless connection. Further, the present embodiment makes it possible to reduce the probability that a process of establishing a wireless connection fails due to communication packets failed to reach a counterpart wireless terminal.

A wireless communication system, a wireless communication method, and a wireless terminal according to preferred embodiments of the present invention are described above. However, the present invention is not limited to the specifically disclosed embodiments, and variations and modifications may be made without departing from the scope of the present invention.

An aspect of this disclosure provides a wireless communication system, a wireless communication method, and a wireless terminal that make it possible to easily or automatically set wireless network (communication) parameters even when a wireless communication protocol other than IPv4, for example, IPv6 is used.

What is claimed is:

1. A wireless communication system, comprising:
a first wireless terminal including
   a first storage that stores a predefined first wireless setting including an IP address of the first wireless terminal and wireless communication parameters,
   a first memory that stores a first program, and
   a first processor that executes the first program to implement
      a first network control unit that sets the first wireless setting stored in the first storage as a current wireless setting of the first wireless terminal,
      a generating unit that generates identification information including a unique identifier of the first wireless terminal, and
      a first wireless communication unit that transmits a signal including the generated identification information; and
a second wireless terminal including
   a second storage that stores one or more predefined second wireless settings each including an IP address and wireless communication parameters, the second wireless settings having been stored in the second storage in advance of the transmission of the signal including the identification information and having never been transmitted from the first wireless terminal,
   a second memory that stores a second program, and
   a second processor that executes the second program to implement
      a second wireless communication unit that receives the signal transmitted by the first wireless communication unit,
      an extracting unit that extracts the unique identifier included in the identification information from the received signal, and
      a second network control unit that
         identifies a second wireless setting corresponding to the first wireless setting from the second wireless settings stored in the second storage based on the extracted unique identifier, and
         sets the identified second wireless setting as a current wireless setting of the second wireless terminal and establishes a wireless connection with the first wireless terminal based on the identified second wireless setting.

2. The wireless communication system as claimed in claim 1, wherein the second network control unit changes the current wireless setting of the second wireless terminal to the identified second wireless setting when the current wireless setting is different from the identified second wireless setting.

3. The wireless communication system as claimed in claim 1, wherein the first network control unit changes the current wireless setting of the first wireless terminal to the first wireless setting when the current wireless setting is different from the first wireless setting.

4. The wireless communication system as claimed in claim 1, wherein
the first wireless setting includes the IP address of the first wireless terminal and the wireless communication parameters including a wireless communication mode, an authentication method, an encryption method, and a wireless communication protocol; and
the second wireless setting includes the IP address and the wireless communication parameters including a wireless communication mode, an authentication method, an encryption method, and a wireless communication protocol that correspond to the first wireless setting.

5. The wireless communication system as claimed in claim 4, wherein the wireless communication mode in each of the first wireless setting and the second wireless setting indicates one of an ad-hoc mode where wireless communications are performed without using an access point and an infrastructure mode where wireless communications are performed via an access point.

6. The wireless communication system as claimed in claim 4, wherein the IP address in each of the first wireless setting and the second wireless setting comprises an IPv4 address and an IPv4 subnet mask.

7. The wireless communication system as claimed in claim 4, wherein the IP address in each of the first wireless setting and the second wireless settings comprises an IPv6 address and an IPv6 address prefix.

8. The wireless communication system as claimed in claim 4, wherein each of the first wireless setting and the second wireless setting further includes at least one of a frequency channel and a network standard.

9. The wireless communication system as claimed in claim 8, wherein the frequency channel in each of the first wireless setting and the second wireless setting is a fixed value or a value specified by a user based on a result of frequency scanning.

10. The wireless communication system as claimed in claim 1, wherein the unique identifier includes at least one of a MAC address of the first wireless terminal, a value obtained by converting the MAC address, a product serial number of the first wireless terminal, a value obtained by converting the product serial number, and a random number.

11. The wireless communication system as claimed in claim 1, wherein the generating unit generates the identification information including at least one of user-specified information, information for identifying the first wireless setting, and a device name of the first wireless terminal in addition to the unique identifier.

12. The wireless communication system as claimed in claim 11, wherein a default value of the device name in the identification information is determined to be unique to the first wireless terminal.

13. The wireless communication system as claimed in claim 1, wherein
the first wireless communication unit encrypts a character string of the identification information; and
the second wireless communication unit decrypts the identification information in the signal.

14. The wireless communication system as claimed in claim 4, wherein the first network control unit
determines whether a same IP address as the IP address in the first wireless setting exists in identification information included in signals transmitted from other wireless terminals, and
reports that the wireless connection cannot be established with the IP address in the first wireless setting when the same IP address exists in the identification information included in the signals transmitted from the other wireless terminals.

15. The wireless communication system as claimed in claim 1, wherein
the second wireless terminal further includes a display that displays a part or a whole of the unique identifier of the first wireless terminal.

16. The wireless communication system as claimed in claim 15, wherein when the wireless communication system includes a plurality of the first wireless terminals, the display displays a list of unique identifiers of the first wireless terminals to allow a user to select one of the first wireless terminals to be connected to the second wireless terminal.

17. The wireless communication system as claimed in claim 1, wherein
when the second wireless terminal is switched to another second wireless terminal,
the second wireless communication unit of the other second wireless terminal receives the signal transmitted from the first wireless terminal,
the extracting unit of the other second wireless terminal extracts the identification information from the signal and extracts the unique identifier from the identification information, and
the second network control unit of the other second wireless terminal identifies and sets the second wireless setting as a current wireless setting of the other second wireless terminal and establishes a wireless connection with the first wireless terminal based on the identified second wireless setting.

18. The wireless communication system as claimed in claim 1, wherein
when terminating the established wireless connection, the second network control unit of the second wireless terminal resets the current wireless setting to a previous wireless setting.

19. A method performed by a first wireless terminal and a second wireless terminal of a wireless communication system, the method comprising:
steps, performed by the first wireless terminal, of
setting a predefined first wireless setting stored in the first wireless terminal as a current wireless setting of the first wireless terminal, the first wireless setting including an IP address of the first wireless terminal and wireless communication parameters,
generating identification information including a unique identifier of the first wireless terminal, and
transmitting a signal including the generated identification information; and
steps, performed by the second wireless terminal, of
receiving the signal transmitted from the first wireless terminal,
extracting the unique identifier included in the identification information from the received signal,
identifying a second wireless setting corresponding to the first wireless setting from one or more predefined second wireless settings stored in the second wireless terminal based on the extracted unique identifier, each of the second wireless settings including an IP address and wireless communication parameters, and the second wireless settings having been stored in the second wireless terminal in advance of the transmission of the signal including the identification information and having never been transmitted from the first wireless terminal;
setting the identified second wireless setting as a current wireless setting of the second wireless terminal, and
establishing a wireless connection with the first wireless terminal based on the identified second wireless setting.

20. A wireless terminal, comprising:
a storage that stores a predefined first wireless setting corresponding to a second wireless setting in one or more predefined second wireless settings stored in another wireless terminal, the first wireless setting including an IP address of the first wireless terminal and wireless communication parameters, and each of the second wireless settings including an IP address and wireless communication parameters;
a memory that stores a program; and
a processor that executes the program to implement
a network control unit that sets the first wireless setting as a current wireless setting of the wireless terminal;
a generating unit that generates identification information including a unique identifier of the wireless terminal; and a wireless communication unit that transmits a signal including the generated identification information to cause the other wireless terminal to extract the unique identifier included in the identification information from the signal, to identify the second wireless setting corresponding to the first wireless setting from the stored second wireless settings based on the extracted unique identifier, and to establish a wireless connection with the wireless terminal based on the identified second wireless setting, wherein the second wireless settings have been stored in the other wireless terminal in advance of the transmission of the signal including the identification information, and the second wireless settings have never been transmitted from the wireless terminal to the other wireless terminal.

* * * * *